(12) United States Patent
Moskalev et al.

(10) Patent No.: US 7,660,916 B2
(45) Date of Patent: Feb. 9, 2010

(54) EMULATION OF INDEPENDENT ACTIVE DMA CHANNELS WITH A SINGLE DMA CAPABLE BUS MASTER HARDWARE AND FIRMWARE

(75) Inventors: Anatoly Moskalev, Bethlehem, PA (US); Parakalan Venkataraghaven, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 479 days.

(21) Appl. No.: 11/155,000

(22) Filed: Jun. 16, 2005

(65) Prior Publication Data

US 2006/0288128 A1 Dec. 21, 2006

(51) Int. Cl.
G06F 13/00 (2006.01)
G06F 13/36 (2006.01)
(52) U.S. Cl. .............................. 710/22; 710/29; 710/38
(58) Field of Classification Search ................. 365/221; 710/22, 23, 26, 38, 5, 62, 1; 711/206
See application file for complete search history.

(56) References Cited

U.S. PATENT DOCUMENTS

| | | | | |
|---|---|---|---|---|
| 4,417,304 A | * | 11/1983 | Dinwiddie, Jr. .............. | 710/25 |
| 4,699,060 A | * | 10/1987 | Vuillaume et al. .......... | 102/313 |
| 5,598,575 A | * | 1/1997 | Dent et al. .................... | 710/28 |
| 5,642,489 A | * | 6/1997 | Bland et al. .................. | 710/308 |
| 5,862,408 A | * | 1/1999 | Dey et al. ..................... | 710/38 |
| 5,970,070 A | * | 10/1999 | Ho et al. ...................... | 370/462 |
| 6,065,070 A | * | 5/2000 | Johnson ........................ | 710/22 |
| 6,185,634 B1 | * | 2/2001 | Wilcox ......................... | 710/26 |
| 6,643,716 B2 | * | 11/2003 | Hunsaker et al. ............. | 710/21 |
| 6,785,284 B1 | * | 8/2004 | Hagen ...................... | 370/395.5 |
| 7,500,028 B2 | * | 3/2009 | Yamagishi ................... | 710/22 |

* cited by examiner

*Primary Examiner*—Henry W. H. Tsai
*Assistant Examiner*—Cheng-Yuan Tseng

(57) ABSTRACT

The present invention utilizes a single DMA engine to process the requests of active DMA channels competing for transfer of data over a single bus. The invention employs two identical sets of DMA request registers which are connected to a processor. These register sets are connected through a switching means to the DMA engine. While a first DMA transfer represented by a first set of registers is active, the process enables preparation of the next request in a second set of registers. Upon completion of the first DMA transfer, the DMA engine is switched to commence processing of the DMA request represented by the second set of registers.

12 Claims, 1 Drawing Sheet

EMULATION OF INDEPENDENT ACTIVE DMA CHANNELS WITH A SINGLE DMA CAPABLE BUS MASTER HARDWARE AND FIRMWARE

FIELD OF THE INVENTION

The present invention relates to systems and methods for transferring data to and from memory in a computer system. More particularly, the present invention relates to systems and methods for servicing data via direct memory access (DMA) over a single memory bus.

BACKGROUND OF THE INVENTION

An important operational aspect of a computer or computer system is the need to transfer data to and from the memory of the computer. One method of transferring data is the use of Direct Memory Access (DMA). A DMA controller permits a device to transfer data over a DMA channel to a memory bus and thereby to access the computer's memory essentially without the use of the computer's processor. A significant advantage of DMA is that large amounts of data may be transferred before generating an interrupt to the computer to signal that the task is completed. Because the DMA controller is transferring the data, the processor is therefore free to perform other tasks.

In the relatively common case when several simultaneously active DMA channels are used to transfer data via a single bus, only a single DMA channel can use the bus at any given moment in time. As a result, the DMA hardware corresponding to all other channels is idle. This redundancy of hardware results in increased gate count and cost of system components.

In dealing with competing DMA hardware attempting to access a single bus, previous attempts to solve this problem rely chiefly on using separate DMA engines with separate sets of registers. In addition, theses methods typically provide some bus arbitration logic, which switches the bus between different DMA engines according to some algorithm to provide parallel transfer activity of engines to transfer data through the bus. These approaches do not address the problem of redundant DMA engines and channels as they merely associate an engine with a single DMA channel. Accordingly, since only one DMA engine could use the bus at any given moment, all other DMA engines sit idle. Further, such DMA engines typically require additional logic to handle complexities of DMA transfer, such as changing burst size and data width used in the bus to accommodate byte granularity of a transfer. In addition, arbitration algorithms that are capable of providing parallel transfer of several DMA channels with flexible priorities and adequately small granularity of transfer require relatively complicated logic.

Due to the above considerations, previous methods of processing data over a single bus by simultaneously active DMA channels result in redundant, more complex DMA engines—requiring a significant increase in gate count and cost than that of a single, simple DMA engine.

SUMMARY OF THE INVENTION

The present invention utilizes a single DMA engine to process the requests of active DMA channels for transfer of data over a single bus. In one embodiment of the invention this is achieved by employing two identical sets of DMA request registers which are each connected to a processor. These register sets are connected through a switching means to the DMA engine. While a first DMA transfer represented by a first set of registers is active, the processor prepares the next request in a second set of registers. Upon completion of the first DMA transfer, the DMA engine is switched to commence processing of the DMA request represented by the second set of registers.

DETAILED DESCRIPTION

Figure 1:
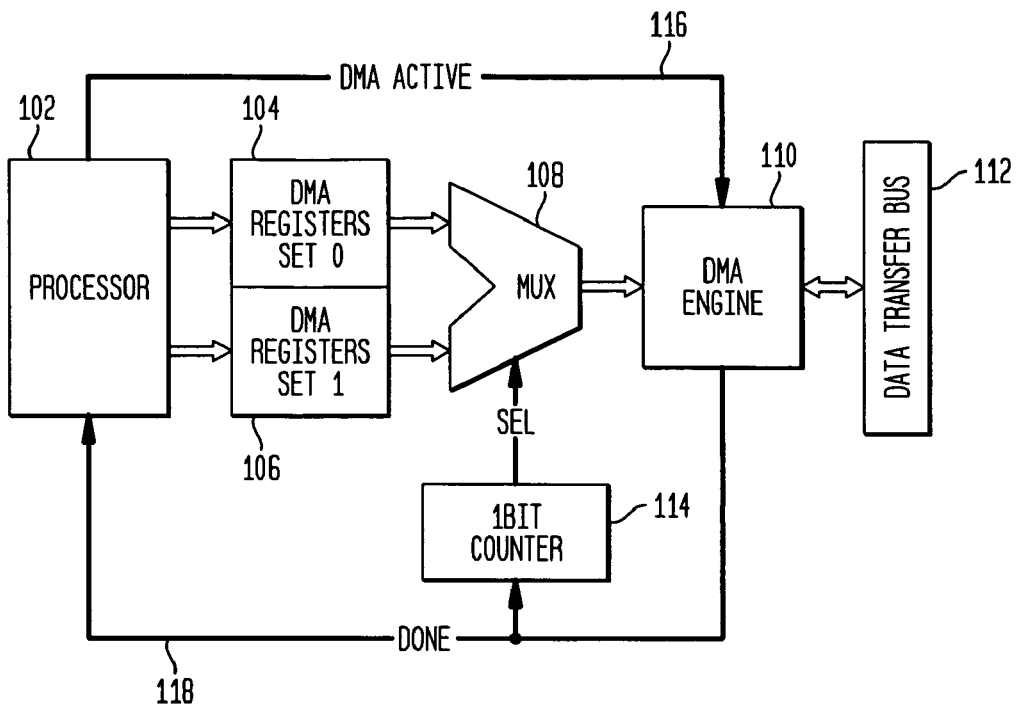
FIG. 1 is a schematic representation of one embodiment of the invention.

In the embodiment of the invention depicted in FIG. 1, a DMA engine 110 performs data communication over a data transfer bus 112 of a digital processing system. As is well known in the prior art, a DMA engine is essentially a set of logic gates which perform a DMA communication. As is also well known, such a communication is described by parameters such as source and destination addresses, number of bus transfer bursts, size of a bursts, etc. In the embodiment depicted in FIG. 1, these parameters are stored in DMA register sets 104 and 106.

Multiplexer 108 connects one of the DMA register sets 104, 106 to the DMA engine 110 based on a select signal level (SEL). Processor 102 activates DMA engine 110 by setting a DMA ACTIVE signal on line 116. After this activation, the DMA engine 110 performs a data transfer on the bus, which is described by values in the DMA register set selected by SEL. This transfer requires some time to complete and, after its completion, the DMA engine 110 issues a DONE signal pulse on line 118 to the processor 102. It should be noted that DMA transfer requests could come from programs running on the processor 102 or from external inputs to the processor 102 (not shown).

As the above described DMA transfer is occurring, the processor is capable of preparing for the next DMA transfer by placing the appropriate transfer parameters in the alternative DMA register set. Thus by way of example, while DMA register set 104 is being utilized by DMA engine 110 to effect a data transfer, DMA register set 106 (which is not connected to DMA engine 110) is prepared for a subsequent DMA transfer. At the completion of the DMA transfer, the DONE pulse generated by DMA engine 110 results in a switching of the level of the SEL signal. In the embodiment of the invention illustrated in FIG. 1, this switching actually corresponds to a single bit counter functionality. The invention is not so limited as this feature could be implemented by any number of other hardware or firmware logic devices.

Figure 2:
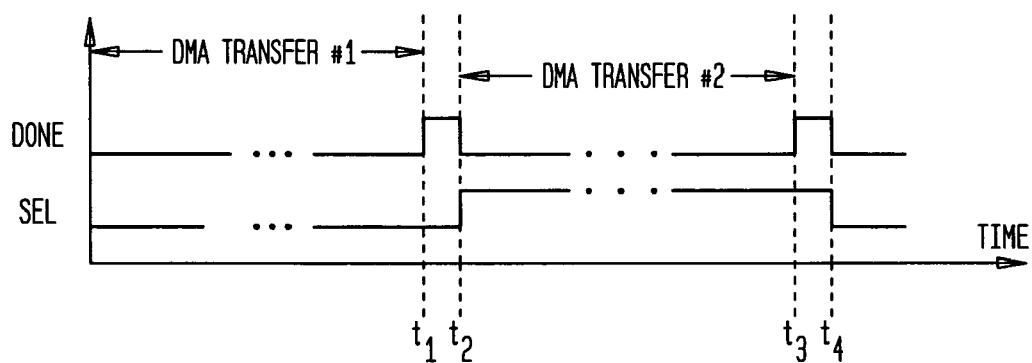
FIG. 2 is a timing diagram showing signaling related to DMA transfers performed by an embodiment of the invention.

FIG. 2 depicts a simple timing diagram in which the DONE pulse and SEL signal are depicted relative to the timing of two illustrated DMA transfers. DMA transfer #1 is completed at time $t_1$. Subsequent to this completion (i.e., at time $t_2$), a switching of the level of the SEL signal occurs and DMA transfer #2 is activated. Upon completion of DMA transfer #2 at time $t_3$, switching of the level of the SEL signal again occurs at time $t_4$. As depicted in FIG. 1, each DONE pulse (at times $t_1$ and $t_3$) is also received at the processor 102. Consequently, the processor can at these times immediately make a new DMA engine activation. After detecting the DONE pulse (e.g., at time $t_1$), the processor properly switches between DMA register sets 104, 106 to permit storing of transfer parameters related to the next request while the DMA engine 110 is performing the DMA transfer corresponding to the request programmed in the alternative DMA register's set.

In the above described embodiment, the processor detects a DONE pulse and then causes the activation of the DMA engine. Use of the processor to perform these functions results in a time delay prior to the commencement of the next DMA transfer. In an alternative embodiment of the invention, this delay can be reduced by use of hardware logic to initiate the activation of the DMA engine. That is, DMA hardware would detect a DONE pulse and immediately start a new transfer without any processor participation.

Additional features of the invention will now be discussed that are made possible by the disparity in the time needed to complete an actual DMA transfer relative to the time associated with processing a DMA request. A typical DMA transfer in a conventional system may take on the order of $10^5$ to $10^6$ processor clock cycles to complete. In the present invention, the processing of each DMA request is relatively small, typically in the order of $10^2$ to $10^3$ processor clock cycles. As a result, this relative timing of the DMA operations permits the processor to have sufficient time to compute some state machine transitions describing bus arbitration and different DMA channels' functionality. In particular, additional embodiments of the invention permit programming an arbitrary number of DMA channels with different special functionality associated with each channel. By way of examples, regular DMA, scatter-gather type DMA, DMA with some data processing on the fly, and single ended DMA between processor 102 of FIG. 1 and the bus 112 are possible. This arrangement also permits incorporating various arbitration algorithms with dynamic changes of priorities of DMA channels.

In further embodiments of the invention, a large DMA transfer request can be segmented by the processor. In this manner, additional DMA transfers (e.g., some with higher priorities) can be interleaved in time with the segment transfers of the large request. The invention's use of the processor and DMA register sets to control DMA transfers thus creates a flexibility in the present invention which permits DMA transfers to be occurring substantially simultaneously. This time multiplexing of the DMA transfers makes it appear to the user that multiple DMA transfers are occurring in parallel.

Accordingly, these various embodiments of the invention permit emulating several active DMA channels selected from an arbitrary number of channels with different special features contained on every DMA channel. This functionality is attained by a relatively simple single DMA engine controlled by a small processing core 102. In particular, specific and complex DMA requests are effected using simple DMA requests implemented using the above described register sets. As a result, the invention permits overall gate count and cost to be reduced without loss of any data traffic capability.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for transferring data over a memory bus in a computer system having a processor and at least two Direct Memory Access (DMA) channels, the method comprising:
   connecting a first set and a second set of DMA registers to the processor;
   routing both sets of DMA registers through a switch to a single DMA engine, such that only one set is connected to the DMA engine at a time;
   storing transfer parameters related to a first DMA request in the first set of DMA registers;
   selecting through the switch the first set of DMA registers;
   sending an activation signal to the DMA engine that causes the DMA engine to perform a first data transfer on the bus in accordance with the parameters stored in the first DMA register set;
   storing transfer parameters related to a second DMA request in the second set of DMA registers, wherein the first and the second DMA requests are for different DMA channels coupled to the bus; and
   upon completion of the first data transfer, selecting through the switch the second set of DMA registers and sending an activation signal to the DMA engine that causes the DMA engine to perform a second data transfer on the bus in accordance with the parameters stored in the second DMA register set, wherein the selecting through the switch is based on a select signal generated by a one bit counter.

2. The method of claim 1 further comprising:
   storing transfer parameters related to a subsequent DMA request in one of the sets of DMA registers that is not being used in a current data transfer; and,
   upon completion of the current data transfer, performing the selecting and the sending steps such that the DMA engine performs a subsequent data transfer on the bus in accordance with the subsequent parameters.

3. The method of claim 2 wherein the storing of transfer parameters related to the subsequent DMA request occurs while at least some of the current data transfer is taking place.

4. A system for transferring data over a memory bus in a computer system having a processor and at least two Direct Memory Access (DMA) channels, the system comprising:
   a first set and a second set of DMA registers, each connected to the processor and each capable of storing transfer parameters related to a DMA request;
   a switch capable of connecting each of the sets of registers to a single DMA engine such that only one set is connected to the DMA engine at a time, thereby defining a connected, first DMA register set and an unconnected, second DMA register set;
   a processor capable of generating an activation signal which is transmitted to the DMA engine, wherein upon receipt of the signal, the DMA engine performs a first data transfer on the bus in accordance with the parameters stored in the first DMA register set;
   the DMA engine capable of generating a DONE signal upon completion of a DMA transfer, which DONE signal is transmitted to the switch and wherein upon receipt of the DONE signal, the switch connects the second DMA register set to the DMA engine;
   the processor further capable of generating a second activation signal, wherein upon receipt of the second activation signal, the DMA engine performs a second data transfer on the bus in accordance with the parameters stored in the second DMA register set; and
   means for segmenting a DMA transfer request for transferring data over the memory bus and interleaving segments of the DMA transfer request with at least one additional data transfer according to a Select Signal Level (SEL) signal generated by a one bit counter that is incremented upon receipt of each DONE signal.

5. The system of claim 4 wherein the first set and second set of DMA registers are capable of storing subsequent transfer parameters related to a subsequent DMA request in one of the sets of DMA registers that is not being used in a current data transfer;

wherein, upon receipt of the DONE signal, the DMA engine performs a subsequent data transfer on the bus in accordance with the subsequent parameters.

6. The system of claim 5 further comprising:
wherein the switch comprises a multiplexer, the multiplexer connecting only one register set to the DMA engine at a time based on the SEL signal.

7. A method for transferring data over a memory bus in a computer system having a processor and at least two Direct Memory Access (DMA) channels, the method comprising:
connecting a first set and a second set of DMA registers to the processor;
storing transfer parameters related to DMA requests in the sets of DMA registers, wherein the DMA requests are from different DMA channels coupled to the bus;
routing both sets of DMA registers through a switch to a single DMA engine, such that only one set is connected to the DMA engine at a time;
generating a Select Signal Level (SEL) signal from a one bit counter to select the first set of DMA registers to connect through the switch to the DMA engine; and,
generating and sending a DMA active signal to the DMA engine which causes the DMA engine to perform a data transfer on the bus in accordance with the parameters stored in the connected DMA register set.

8. The method of claim 7 further comprising the step of:
generating a DONE signal upon completion of the data transfer wherein the DONE signal causes the SEL signal to connect the second set of DMA registers through the switch to the DMA engine.

9. The method of claim 1 further comprising:
upon completion of the first data transfer, toggling a value of the one bit counter.

10. The system of claim 4 wherein at least a portion of the parameters stored in the second DMA register set are stored therein during the first data transfer.

11. The method as recited in claim 4 wherein the at least one additional data transfer is the second data transfer.

12. The method as recited in claim 1 wherein the first and the second DMA requests are generated by a program running on the processor.

* * * * *